United States Patent
Yu et al.

(10) Patent No.: US 9,194,996 B2
(45) Date of Patent: Nov. 24, 2015

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventors: Gang Yu, Shenzhen (CN); Yuchun Hsiao, Shenzhen (CN); Shihhsiang Chen, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/126,429

(22) PCT Filed: Oct. 30, 2013

(86) PCT No.: PCT/CN2013/086178
§ 371 (c)(1),
(2) Date: Dec. 15, 2013

(65) Prior Publication Data
US 2015/0116626 A1  Apr. 30, 2015

(30) Foreign Application Priority Data
Oct. 22, 2013  (CN) .......................... 2013 1 0500893

(51) Int. Cl.
G02F 1/1333 (2006.01)
F21V 8/00 (2006.01)
G02F 1/1335 (2006.01)

(52) U.S. Cl.
CPC ............ *G02B 6/0073* (2013.01); *G02B 6/0035* (2013.01); *G02F 1/133308* (2013.01); *G02F 1/133605* (2013.01); *G02F 1/133608* (2013.01); *G02F 1/133615* (2013.01)

(58) Field of Classification Search
CPC .................... G02F 1/133308; G02F 1/133608
USPC .......................................................... 349/58
See application file for complete search history.

(56) References Cited

U.S. PATENT DOCUMENTS

| 8,094,856 B2 * | 1/2012 | Hawker et al. ................. 381/355 |
| 2009/0222130 A1 * | 9/2009 | Morse ............................. 700/225 |
| 2010/0165233 A1 | 7/2010 | Jung |
| 2012/0092584 A1 | 4/2012 | Jung et al. |

FOREIGN PATENT DOCUMENTS

| CN | 101630091 A | 1/2010 |
| JP | 2008020557 A | 1/2008 |

* cited by examiner

*Primary Examiner* — Phu Vu
(74) *Attorney, Agent, or Firm* — Andrew C. Cheng

(57) ABSTRACT

The present invention provides a backlight module and a liquid crystal display device using the backlight module. The backlight module includes: a backplane (2), a light guide plate (4) arranged in the backplane (2), a backlight source (6) arranged in the backplane (2), an optic film assembly (8) arranged above the light guide plate (4), and a reflection plate (9) arranged between the backplane (2) and the light guide plate (4). The backlight source (6) includes a PCB (62) and a plurality of LED lights (64) mounted on and electrically connected to the PCB (62). The backplane (2) includes a bottom plate (22) and a plurality of side plates (24) perpendicularly connected to the bottom plate (22). The bottom plate (22) of the backplane (2) includes a snap-engagement structure (220) formed thereon. The PCB (62) is snap-fit into and retained by the snap-engagement structure (220). The reflection plate (9) is directly positioned on and supported by the PCB (62).

9 Claims, 4 Drawing Sheets

BACKLIGHT MODULE AND LIQUID CRYSTAL DISPLAY DEVICE USING SAME

BACKGROUND OF THE INVENTION

1. Field of the Invention

The present invention relates to the field of liquid crystal displaying, and in particular to a backlight module and a liquid crystal display device using the backlight module.

2. The Related Arts

Liquid crystal displays have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, a number of tiny vertical and horizontal electrical wires are arranged between the two glass substrates to selectively receive application of electricity thereto to control the rotation direction of the liquid crystal molecules in order to refract out light emitting from the backlight module for generating images. Since the liquid crystal display panel itself does not emit light, light must be provided by the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal display panel to form a planar light source directly supplied to the liquid crystal display panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

Referring to FIG. 1, a schematic view is given to show the structure of a conventional liquid crystal display device. In the structure, the backlight module has a backlight source 100 that is directly mounted to a bottom plate 302 of a backplane by means of screwing of bolts. The backlight source 100 comprises a printed circuit board (PCB) 102 in which stepped-configuration holes 120 are formed. Heads of bolts 150 are respectively and completely received in the stepped-configuration holes 120 so that the top surface of the PCB 102 is kept regular and flat. A reflector plate 1500 is directly positioned on the PCB 102 so that an arrangement of a supporting structure is not necessary thereby lowering down the cost and at the same time reducing the thickness of the liquid crystal display device.

However, since the PCB 102 has a limited thickness, forming the stepped-configuration holes 120 in the PCB 102 may lead to deterioration of the strength of the PCB 102 so that the bolts 150 that are arranged in the PCB 102 may not securely fix the PCB 102 on the bottom plate 302 of the backplane and thus the quality of the liquid crystal display device is deteriorated.

SUMMARY OF THE INVENTION

An object of the present invention is to provide a backlight module, which has a simple structure and ensures the mounting strength of a printed circuit board so as to improve the quality of a liquid crystal display device that uses the backlight module.

Another object of the present invention is to provide a liquid crystal display device, which has a simple structure and ensures the mounting strength of a printed circuit board so as to improve the quality of the liquid crystal display device and facilitate the achievement of thinning and slimming of the liquid crystal display device.

To achieve the above objects, the present invention provides a backlight module, which comprises: a backplane, a light guide plate arranged in the backplane, a backlight source arranged in the backplane, an optic film assembly arranged above the light guide plate, and a reflection plate arranged between the backplane and the light guide plate. The backlight source comprises a printed circuit board (PCB) and a plurality of light-emitting diode (LED) lights mounted on and electrically connected to the PCB. The backplane comprises a bottom plate and a plurality of side plates perpendicularly connected to the bottom plate. The reflection plate is arranged between the bottom plate of the backplane and the light guide plate. The bottom plate of the backplane comprises a snap-engagement structure formed thereon. The PCB is snap-fit into and retained by the snap-engagement structure. The reflection plate is directly positioned on and supported by the PCB.

The snap-engagement structure comprises a bearing section, a pawl connected to an end of the bearing section that is distant from the bottom plate, and an elastic section that is arranged opposite to the bearing section. The bearing section, the pawl, and the elastic section delimit a receiving space. The PCB is fit into and retained in the receiving space so that the bearing section abuts one side of the PCB and the elastic section abuts an opposite side of the PCB and the pawl engaging and holding down an upper surface of the PCB.

The bearing section and the pawl are integrally formed together and are mounted to the bottom plate through screwing or welding.

The bearing section is formed by upward extending from an inside surface of the bottom plate. The bearing section, the pawl, and the bottom plate are integrally formed together.

The elastic section is made of an elastic material. The elastic section is mounted to the bottom plate through screwing or bonding.

The present invention also provides a backlight module, which comprises: a backplane, a light guide plate arranged in the backplane, a backlight source arranged in the backplane, an optic film assembly arranged above the light guide plate, and a reflection plate arranged between the backplane and the light guide plate, the backlight source comprising a printed circuit board (PCB) and a plurality of light-emitting diode (LED) lights mounted on and electrically connected to the PCB, the backplane comprising a bottom plate and a plurality of side plates perpendicularly connected to the bottom plate, the reflection plate being arranged between the bottom plate of the backplane and the light guide plate, the bottom plate of the backplane comprising a snap-engagement structure formed thereon, the PCB being snap-fit into and retained by the snap-engagement structure, the reflection plate being directly positioned on and supported by the PCB;

wherein the snap-engagement structure comprises a bearing section, a pawl connected to an end of the bearing section that is distant from the bottom plate, and an elastic section that is arranged opposite to the bearing section, the bearing section, the pawl, and the elastic section delimiting a receiving space, the PCB being fit into and retained in the receiving space so that the bearing section abuts one side of the PCB and the elastic section abuts an opposite side of the PCB and the pawl engaging and holding down an upper surface of the PCB.

The bearing section and the pawl are integrally formed together and are mounted to the bottom plate through screwing or welding.

The bearing section is formed by upward extending from an inside surface of the bottom plate. The bearing section, the pawl, and the bottom plate are integrally formed together.

The elastic section is made of an elastic material. The elastic section is mounted to the bottom plate through screwing or bonding.

The present invention further provides a liquid crystal display device, which comprises: a backlight module, a mold frame mounted on the backlight module, a liquid crystal display panel mounted in the mold frame, and a front bezel mounted on the liquid crystal display panel. The backlight module comprises a backplane, a light guide plate arranged in the backplane, a backlight source arranged in the backplane, an optic film assembly arranged above the light guide plate, and a reflection plate arranged between the backplane and the light guide plate. The backlight source comprises a printed circuit board (PCB) and a plurality of light-emitting diode (LED) lights mounted on and electrically connected to the PCB. The backplane comprises a bottom plate and a plurality of side plates perpendicularly connected to the bottom plate. The reflection plate is arranged between the bottom plate of the backplane and the light guide plate. The bottom plate of the backplane comprises a snap-engagement structure formed thereon. The PCB is snap-fit into and retained by the snap-engagement structure. The reflection plate is directly positioned on and supported by the PCB.

The snap-engagement structure comprises a bearing section, a pawl connected to an end of the bearing section that is distant from the bottom plate, and an elastic section that is arranged opposite to the bearing section. The bearing section, the pawl, and the elastic section delimit a receiving space. The PCB is fit into and retained in the receiving space so that the bearing section abuts one side of the PCB and the elastic section abuts an opposite side of the PCB and the pawl engaging and holding down an upper surface of the PCB.

The bearing section and the pawl are integrally formed together and are mounted to the bottom plate through screwing or welding.

The bearing section is formed by upward extending from an inside surface of the bottom plate. The bearing section, the pawl, and the bottom plate are integrally formed together.

The elastic section is made of an elastic material. The elastic section is mounted to the bottom plate through screwing or bonding.

The efficacy of the present invention is that the present invention provides a backlight module and a liquid crystal display device using the backlight module. The backlight module has a simple structure and allows a PCB to be securely mounted in a backplane through the arrangement of a snap-engagement structure on a bottom plate of a backplane, so as to eliminate the deterioration of strength of the PCB caused by applications of fasteners and to improve the quality of the liquid crystal display device using the backlight module and also to ensures regularity and flatness of an upper surface of the PCB to allow a reflection plate to be directly positioned on and supported by the PCB, helping realize thinning of the liquid crystal display device. Further, the PCB being mounted on the bottom plate of the backplane helps realize slimming of the liquid crystal display device.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
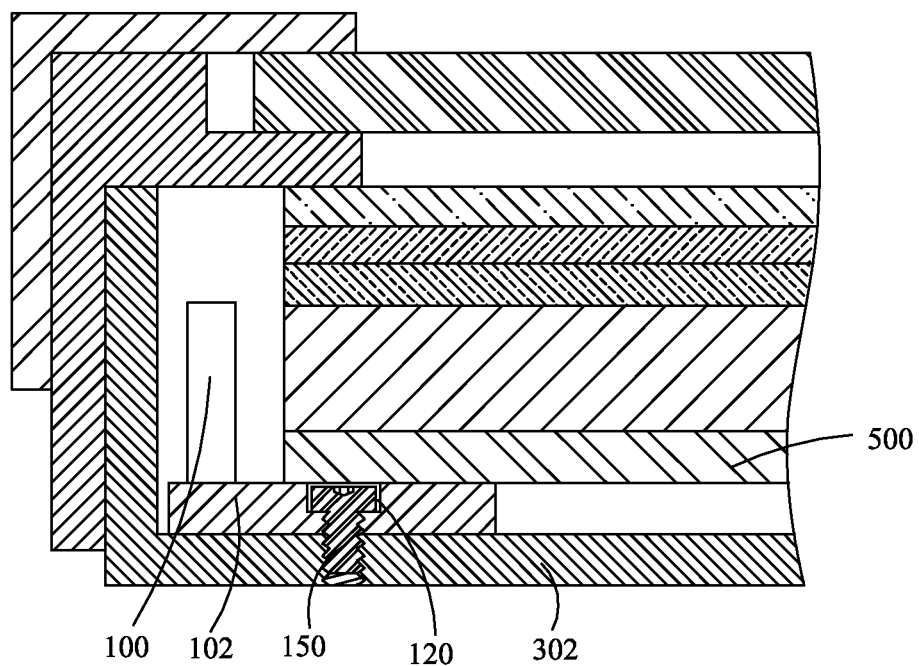
FIG. 1 is a schematic view showing the structure of a conventional liquid crystal display device.
Figure 2:
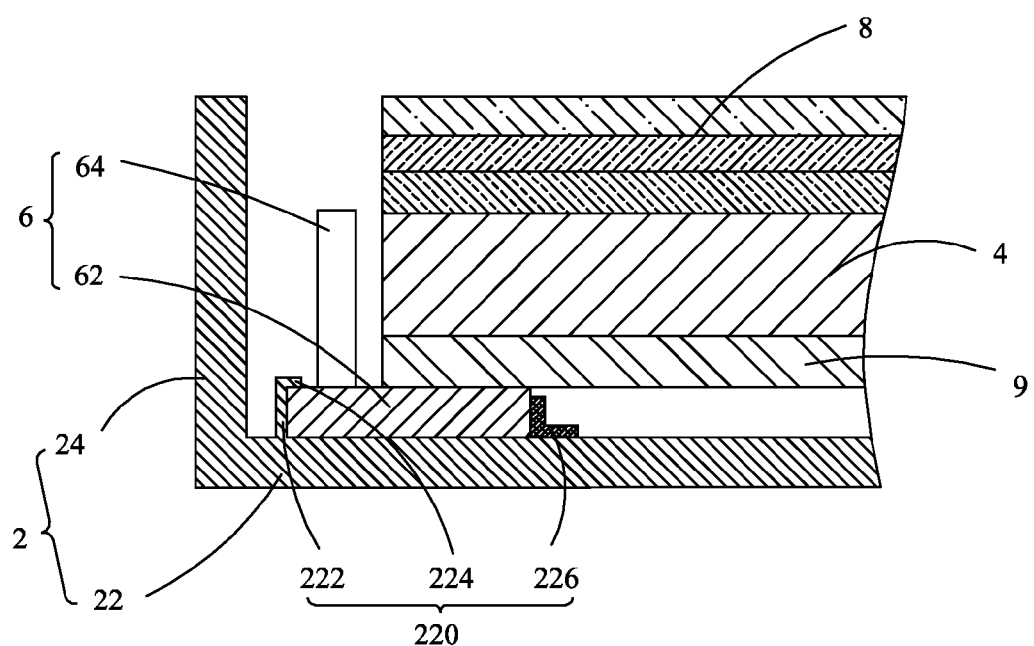
FIG. 2 is a schematic view showing a backlight module according to the present invention.

Referring to FIG. 2, the present invention provides a backlight module, which has a simple structure and specifically comprises: a backplane 2, a light guide plate 4 arranged in the backplane 2, a backlight source 6 arranged in the backplane 2, an optic film assembly 8 arranged above the light guide plate 4, and a reflection plate 9 arranged between the backplane 2 and the light guide plate 4. The backlight source 6 comprises a printed circuit board (PCB) 62 and a plurality of light-emitting diode (LED) lights 64 mounted on and electrically connected to the PCB 62. The backplane 2 comprises a bottom plate 22 and a plurality of side plates 24 perpendicularly connected to the bottom plate 22. The reflection plate 9 is arranged between the bottom plate 22 of the backplane 2 and the light guide plate 4. The bottom plate 22 of the backplane 2 comprises a snap-engagement structure 220 formed thereon. The PCB 62 is snap-fit into and retained by the snap-engagement structure 22. The reflection plate 9 is directly positioned on and supported by the PCB 62. Through snap engagement to mount the PCB 62 of the backlight source 6 on the bottom plate 22 of the backplane 2, the reflection plate 9 is allowed to be directly positioned on and supported by the PCB 62 to realize bearing and supporting of the light guide plate 4 without an arrangement of an additional supporting structure, thereby reducing the thickness of the backlight module and at the same time lowering down the manufacture cost. Further, since the PCB 62 is set in direct contact with the bottom plate 22 of the backplane 2 with a large surface area, conduction and dissipation of heat from the LED lights 64 can be effectively achieved to thereby lowering the temperature of the backlight module and improving the quality of the backlight module.

Specifically, the snap-engagement structure 220 comprises a bearing section 222, a pawl 224 connected to an end of the bearing section 222 that is distant from the bottom plate 22, and an elastic section 226 that is arranged opposite to the bearing section 222. The bearing section 222, the pawl 224, and the elastic section 226 delimit a receiving space. The PCB 62 is fit into and retained in the receiving space so that the bearing section 222 abuts one side of the PCB 62 and the elastic section 226 abuts an opposite side of the PCB 62 and the pawl 224 engaging and holding down an upper surface of the PCB 62.

To mount the backlight source 6, a push force in an outbound direction is first applied to the elastic section 226 and then, the PCB 62 is inserted into the receiving space defined among the bearing section 222, the pawl 224, and the elastic section 226 to have one side of the PCB 62 born on the bearing section 222 with the upper surface of the PCB 62 of said one side engaging and held under the pawl 224. The force applied to the elastic section 226 is then released to allow the elastic section 226 return to a previous position to abut the opposite side of the PCB 62 thereby retaining the backlight source 6 on the bottom plate 22 of the backplane 2.

With the snap-engagement structure 220, the PCB 62 is securely mounted in the backplane 2 so that deterioration of strength of the PCB 62 caused by application of bolts can be eliminated and the quality of the backlight module is improved. Regularity of the upper surface of the PCB 62 can be ensured to allow the reflection plate 9 to be directly positioned on and supported by the PCB 62 so as to facilitate thinning of a liquid crystal display device that uses the backlight module. Further, the PCB 62 is mounted on the bottom plate 22 of the backplane 2 so that thinning of a liquid crystal display device using the backlight module can be achieved.

In the instant embodiment, the elastic section 226 is made of an elastic material, preferably an elastic rubber material. The elastic section 226 is mounted to the bottom plate 22 through screwing or bonding. The bearing section 222 and the pawl 224 of the snap-engagement structure 220 can be integrally formed together and mounted to the bottom plate 22 through screwing or welding. Or, alternatively, the bearing section is formed by upward extending from an inside surface of the bottom plate and the bearing section 222, the pawl 224, and the bottom plate 22 are integrally formed together.

Figure 3:
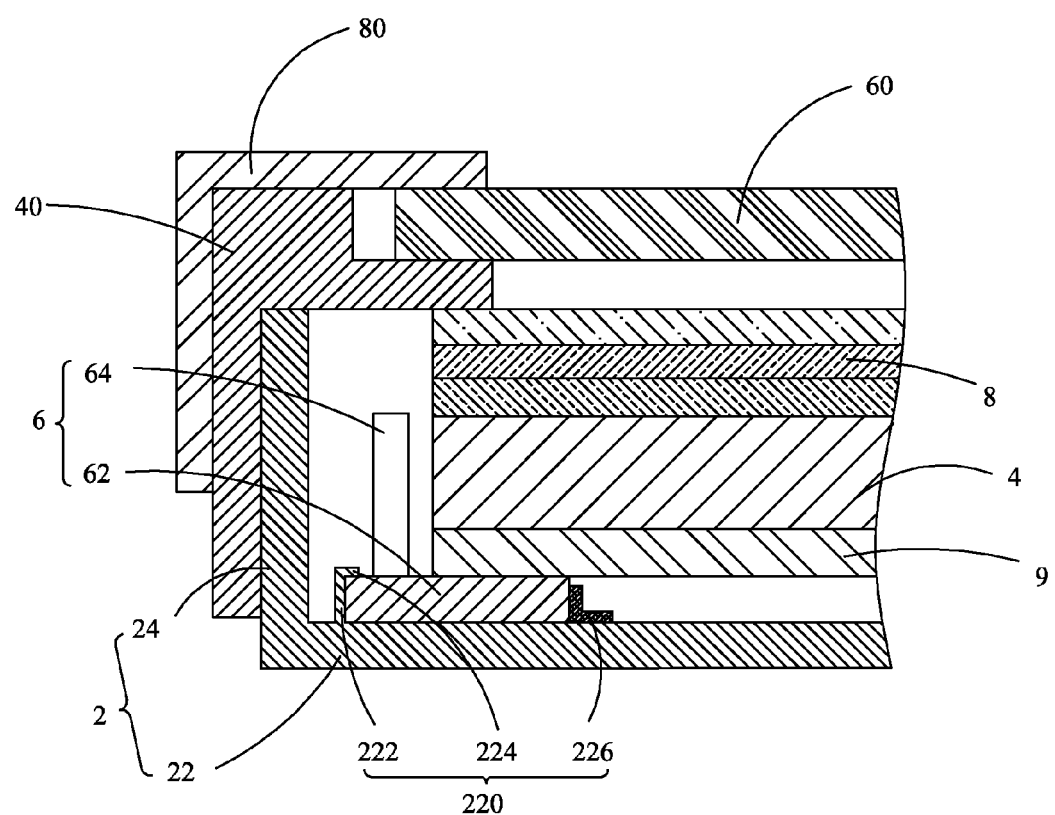
FIG. 3 is a schematic view showing a liquid crystal display device according to the present invention.
Figure 4:
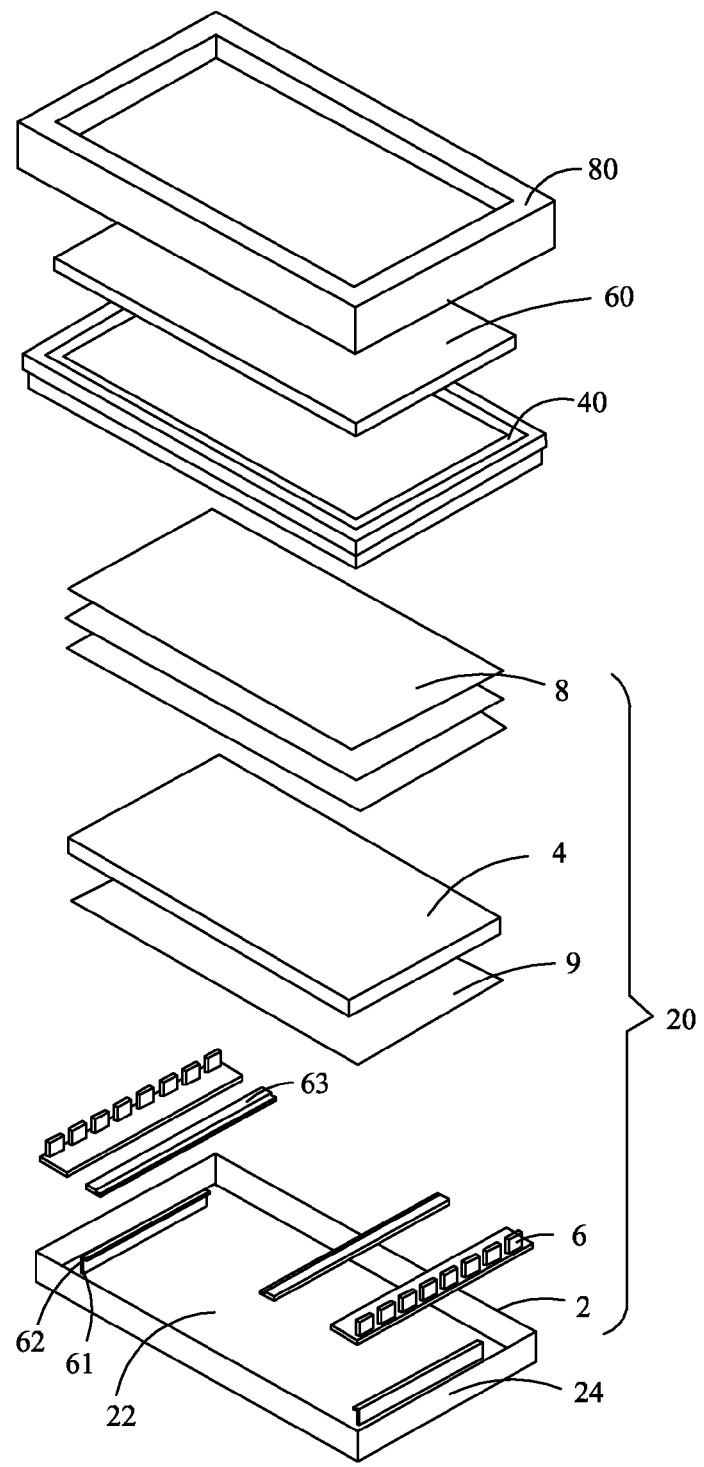
FIG. 4 is an exploded view showing the liquid crystal display device according to the present invention.

Referring to FIGS. 3 and 4, the present invention provides a liquid crystal display device, which comprises: a backlight module 20, a mold frame 40 mounted on the backlight module 20, a liquid crystal display panel 60 mounted in the mold frame 40, and a front bezel 80 mounted on the liquid crystal display panel 60. The backlight module 20 comprises a backplane 2, a light guide plate 4 arranged in the backplane 2, a backlight source 6 arranged in the backplane 2, an optic film assembly 8 arranged above the light guide plate 4, and a reflection plate 9 arranged between the backplane 2 and the light guide plate 4. The backlight source 6 comprises a PCB 62 and a plurality of LED lights 64 mounted on and electrically connected to the PCB 62. The backplane 2 comprises a bottom plate 22 and a plurality of side plates 24 perpendicularly connected to the bottom plate 22. The reflection plate 9 is arranged between the bottom plate 22 of the backplane 2 and the light guide plate 4. The bottom plate 22 of the backplane 2 comprises a snap-engagement structure 220 formed thereon. The PCB 62 is snap-fit into and retained by snap-engagement structure 22. The reflection plate 9 is directly positioned on and supported by the PCB 62. Through snap engagement to mount the PCB 62 of the backlight source 6 on the bottom plate 22 of the backplane 2, the reflection plate 9 is allowed to be directly positioned on and supported by the PCB 62 to realize bearing and supporting of the light guide plate 4 without an arrangement of an additional supporting structure, thereby reducing the thickness of the backlight module and at the same time lowering down the manufacture cost. Further, since the PCB 62 is set in direct contact with the bottom plate 22 of the backplane 2 with a large surface area, conduction and dissipation of heat from the LED lights 64 can be effectively achieved to thereby lowering the temperature of the backlight module and improving the quality of the backlight module.

Specifically, the snap-engagement structure 220 comprises a bearing section 222, a pawl 224 connected to an end of the bearing section 222 that is distant from the bottom plate 22, and an elastic section 226 that is arranged opposite to the bearing section 222. The bearing section 222, the pawl 224, and the elastic section 226 delimit a receiving space. The PCB 62 is fit into and retained in the receiving space so that the bearing section 222 abuts one side of the PCB 62 and the elastic section 226 abuts an opposite side of the PCB 62 and the pawl 224 engaging and holding down an upper surface of the PCB 62.

To mount the backlight source 6, a push force in an outbound direction is first applied to the elastic section 226 and then, the PCB 62 is inserted into the receiving space defined among the bearing section 222, the pawl 224, and the elastic section 226 to have one side of the PCB 62 born on the bearing section 222 with the upper surface of the PCB 62 of said one side engaging and held under the pawl 224. The force applied to the elastic section 226 is then released to allow the elastic section 226 return to a previous position to abut the opposite side of the PCB 62 thereby retaining the backlight source 6 on the bottom plate 22 of the backplane 2.

With the snap-engagement structure 220, the PCB 62 is securely mounted in the backplane 2 so that deterioration of strength of the PCB 62 caused by application of fasteners can be eliminated and the quality of the backlight module 20 is improved. Regularity of the upper surface of the PCB 62 can be ensured to allow the reflection plate 9 to be directly positioned on and supported by the PCB 62 so as to facilitate thinning of a liquid crystal display device that uses the backlight module. Further, the PCB 62 is mounted on the bottom plate 22 of the backplane 2 so that thinning of a liquid crystal display device using the backlight module can be achieved.

In the instant embodiment, the elastic section 226 is made of an elastic material, preferably an elastic rubber material. The elastic section 226 is mounted to the bottom plate 22 through screwing or bonding. The bearing section 222 and the pawl 224 of the snap-engagement structure 220 can be integrally formed together and mounted to the bottom plate 22 through screwing or welding. Or, alternatively, the bearing section is formed by upward extending from an inside surface of the bottom plate 22 and the bearing section 222, the pawl 224, and the bottom plate 22 are integrally formed together.

In summary, the present invention provides a backlight module and a liquid crystal display device using the backlight module. The backlight module has a simple structure and allows a PCB to be securely mounted in a backplane through the arrangement of a snap-engagement structure on a bottom plate of a backplane, so as to eliminate the deterioration of strength of the PCB caused by applications of fasteners and to improve the quality of the liquid crystal display device using the backlight module and also to ensures regularity and flatness of an upper surface of the PCB to allow a reflection plate to be directly positioned on and supported by the PCB, helping realize thinning of the liquid crystal display device. Further, the PCB being mounted on the bottom plate of the backplane helps realize slimming of the liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane, a backlight source arranged in the backplane, an optic film assembly arranged above the light guide plate, and a reflection plate arranged between the backplane and the light guide plate, the backlight source comprising a printed circuit board (PCB) and a plurality of light-emitting diode (LED) lights mounted on and electrically connected to the PCB, the backplane comprising a bottom plate and a plurality of side plates perpendicularly connected to the bottom plate, the reflection plate being arranged between the bottom plate of the backplane and the light guide plate, the bottom plate of the backplane comprising a snap-engagement structure formed thereon, the PCB being snap-fit into and retained by the snap-engagement structure, the reflection plate being directly positioned on and supported by the PCB;

wherein the snap-engagement structure comprises a bearing section, a pawl connected to an end of the bearing section that is distant from the bottom plate, and an elastic section that is arranged opposite to the bearing section, the bearing section, the pawl, and the elastic section delimiting a receiving space, the PCB being fit into and retained in the receiving space so that the bearing section abuts one side of the PCB and the elastic section abuts an opposite side of the PCB and the pawl engaging and holding down an upper surface of the PCB;

wherein the bearing section and the pawl are integrally formed together and are mounted to the bottom plate through screwing or welding;

wherein the bearing section is formed by upward extending from an inside surface of the bottom plate, the bearing section, the pawl, and the bottom plate being integrally formed together; and wherein the elastic section is made of an elastic material, the elastic section being mounted to the bottom plate through screwing or bonding.

2. A backlight module, comprising: a backplane, a light guide plate arranged in the backplane, a backlight source arranged in the backplane, an optic film assembly arranged above the light guide plate, and a reflection plate arranged between the backplane and the light guide plate, the backlight source comprising a printed circuit board (PCB) and a plurality of light-emitting diode (LED) lights mounted on and electrically connected to the PCB, the backplane comprising a bottom plate and a plurality of side plates perpendicularly connected to the bottom plate, the reflection plate being arranged between the bottom plate of the backplane and the light guide plate, the bottom plate of the backplane comprising a snap-engagement structure formed thereon, the PCB being snap-fit into and retained by the snap-engagement structure, the reflection plate being directly positioned on and supported by the PCB;

wherein the snap-engagement structure comprises a bearing section, a pawl connected to an end of the bearing section that is distant from the bottom plate, and an elastic section that is arranged opposite to the bearing section, the bearing section, the pawl, and the elastic section delimiting a receiving space, the PCB being fit into and retained in the receiving space so that the bearing section abuts one side of the PCB and the elastic section abuts an opposite side of the PCB and the pawl engaging and holding down an upper surface of the PCB.

3. The backlight module as claimed in claim 2, wherein the bearing section and the pawl are integrally formed together and are mounted to the bottom plate through screwing or welding.

4. The backlight module as claimed in claim 2, wherein the bearing section is formed by upward extending from an inside surface of the bottom plate, the bearing section, the pawl, and the bottom plate being integrally formed together.

5. The backlight module as claimed in claim 2, wherein the elastic section is made of an elastic material, the elastic section being mounted to the bottom plate through screwing or bonding.

6. A liquid crystal display device, comprising: a backlight module, a mold frame mounted on the backlight module, a liquid crystal display panel mounted in the mold frame, and a front bezel mounted on the liquid crystal display panel, the backlight module comprising a backplane, a light guide plate arranged in the backplane, a backlight source arranged in the backplane, an optic film assembly arranged above the light guide plate, and a reflection plate arranged between the backplane and the light guide plate, the backlight source comprising a printed circuit board (PCB) and a plurality of light-emitting diode (LED) lights mounted on and electrically connected to the PCB, the backplane comprising a bottom plate and a plurality of side plates perpendicularly connected to the bottom plate, the reflection plate being arranged between the bottom plate of the backplane and the light guide plate, the bottom plate of the backplane comprising a snap-engagement structure formed thereon, the PCB being snap-fit into and retained by the snap-engagement structure, the reflection plate being directly positioned on and supported by the PCB.

wherein the snap-engagement structure comprises a bearing section, a pawl connected to an end of the bearing section that is distant from the bottom plate, and an elastic section that is arranged opposite to the bearing section, the bearing section, the pawl, and the elastic section delimiting a receiving space, the PCB being fit into and retained in the receiving space so that the bearing section abuts one side of the PCB and the elastic section abuts an opposite side of the PCB and the pawl engaging and holding down an upper surface of the PCB.

7. The liquid crystal display device as claimed in claim 6, wherein the bearing section and the pawl are integrally formed together and are mounted to the bottom plate through screwing or welding.

8. The liquid crystal display device as claimed in claim 6, wherein the bearing section is formed by upward extending from an inside surface of the bottom plate, the bearing section, the pawl, and the bottom plate being integrally formed together.

9. The liquid crystal display device as claimed in claim 6, wherein the elastic section is made of an elastic material, the elastic section being mounted to the bottom plate through screwing or bonding.

* * * * *